No. 836,894. PATENTED NOV. 27, 1906.
T. R. REICHELDERFER.
DEVICE FOR CONNECTING GAS METERS WITH PROVERS.
APPLICATION FILED OCT. 30, 1905.
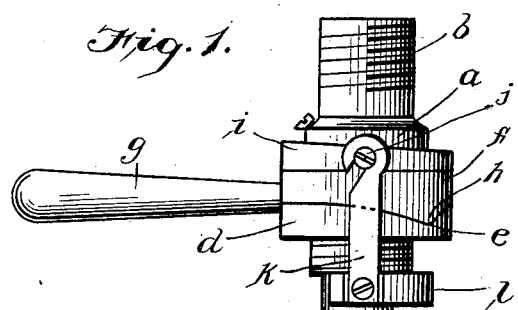
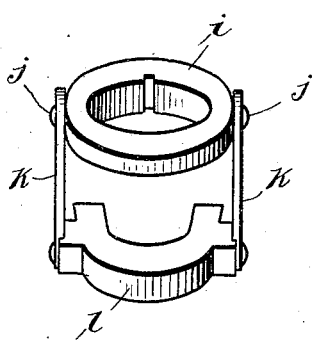
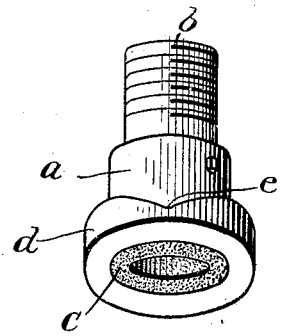
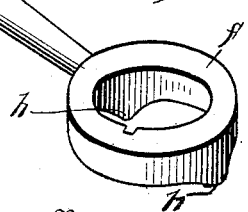

UNITED STATES PATENT OFFICE.

THOMAS RITTER REICHELDERFER, OF NEWARK, NEW JERSEY.

DEVICE FOR CONNECTING GAS-METERS WITH PROVERS.

No. 836,894.　　　Specification of Letters Patent.　　　Patented Nov. 27, 1906.

Application filed October 30, 1905. Serial No. 285,221.

*To all whom it may concern:*

Be it known that I, THOMAS RITTER REICHELDERFER, a citizen of the United States, residing at Newark, State of New Jersey, have invented certain new and useful Improvements in Devices for Connecting Gas-Meters with Provers, of which the following is a full, clear, and exact specification.

The present invention relates to a device adapted to make a quick and tight connection between gas-meters and provers more especially; but the attachment can be used also for many other purposes where a quick connection is necessary.

Heretofore for connecting a meter to a prover couplings were used which required the application of a wrench for loosening or tightening. My attachment is such that when screwed fast into a prover it can instantly be connected to the side pipe of the meter.

In the accompanying drawings, forming part of this specification, the attachment is illustrated in Figure 1 as a side elevation of the same with the thread at the upper end to fit in a prover connection and with the side pipe of a meter in position. Fig. 2 is a perspective view of the ring with the interchangeable strap loosely moving on the head of the screw to be connected to the meter. Fig. 3 is a perspective view of this screw and head, showing the rubber packing at the lower end and the notched clamping ring or flange. Fig. 4 shows in perspective the ring with projections working between the notched ring of the head and the upper loose ring.

The body $a$, having its upper end $b$ screw-threaded, is longitudinally perforated for the passage of the gas and is countersunk at the lower end to receive a rubber ring or other packing $c$, so that the end of a side pipe of a meter when strongly pressed against the packing $c$ will form a tight connection. The lower end is also provided with a flange or ring $d$, having at the upper surface V-shaped notches $e$, preferably two, being diagonally opposite each other.

A ring $f$, with a lever $g$ turning freely on the body $a$, is provided with V-shaped projections $h$, adapted to coöperate with the notches $e$. Another ring $i$, the upper surface of which may be slightly beveled, is also mounted loosely on the body $a$. This ring is preferably provided with means to prevent it from turning and allowing it to slide longitudinally—for instance, a pin (shown in Fig. 3) and a groove, as shown in Fig. 2. The ring $i$ is also provided with two pins or pivots $j\ j$, screwed into the ring at two points diagonally opposite to each other. Two links $k\ k$, with hook-shaped ends adapted to grip over the pivots $j$, are secured with their lower ends to a half-ring or strap $l$, which is adapted to grip a side pipe $m$ of a meter just under its threaded end.

When the device is to be used, the body $a$, fully mounted, as shown in Fig. 1, is tightly secured to a prover connection by a screw-cap or otherwise. Then the side pipe $m$ of the meter is placed upon the rubber packing $c$ by sliding it sidewise into the strap $l$. The lever $g$ is now turned, and it is evident that the projection $h$ in moving out of the notches $e$ will press the ring $i$ upwardly, so that the links $k\ k$, with the strap $l$, press the mouth of the pipe $m$ tightly into the rubber packing. A disconnection can be made just as readily by pushing back the lever $g$ into its normal position, which will allow the pipe $m$ to be freed, so that it can be pushed out of the strap $l$.

Having thus described my invention, what I claim is—

A connecting device for gas-meters and provers consisting of a screw to be connected to a prover, of a cylindrical body $a$ with flange $d$, integral with the screw, said flange having V-shaped notches $e$ and a rubber packing $c$ on its face, of a ring $i$ adapted to slide longitudinally on the body $a$ but prevented from turning thereon, of a yoke with strap $l$ grasping with hooks over pins $j$ on said ring $i$, and of a ring $f$ with V-shaped projections $h$ adapted to coöperate with the notches $e$ and flange $d$, said ring being provided with a lever $g$ to turn it on the body $a$, substantially as described and for the purpose set forth.

In testimony whereof I affix my signature.

THOMAS RITTER REICHELDERFER.

In presence of—
　MARTIN C. LEAVERS,
　EDWARD C. DURR.